United States Patent [19]

Shimokawa

[11] 4,274,138
[45] Jun. 16, 1981

[54] STORED PROGRAM CONTROL SYSTEM WITH SWITCHING BETWEEN INSTRUCTION WORD SYSTEMS

[75] Inventor: Yoshiyuki Shimokawa, Hachioji, Japan

[73] Assignee: Tokyo Shibaura Denki Kabushiki Kaisha, Japan

[21] Appl. No.: 11,912

[22] Filed: Feb. 13, 1979

[30] Foreign Application Priority Data

Jul. 31, 1976 [JP] Japan .................................. 51-90847

[51] Int. Cl.³ .............................................. G06F 9/22
[52] U.S. Cl. ................................................... 364/200
[58] Field of Search ................. 364/900 MS File, 200

[56] References Cited

U.S. PATENT DOCUMENTS

| | | | |
|---|---|---|---|
| 3,631,405 | 12/1971 | Hoff et al. ............................. | 364/200 |
| 3,686,639 | 8/1972 | Fletcher et al. ....................... | 364/200 |
| 4,107,785 | 8/1978 | Seipp .................................... | 364/900 |
| 4,131,943 | 12/1978 | Shiraogawa ........................... | 364/200 |

OTHER PUBLICATIONS

Takei, F., et al., New Sequence Controller, "PROSEC", *Toshiba Review*, vol. 28, No. 2, pp. 171-177, 1973.

*Primary Examiner*—Raulfe B. Zache
*Attorney, Agent, or Firm*—Stevens, Davis, Miller & Mosher

[57] ABSTRACT

In a stored program type control system comprising a main memory device for storing data and an instruction word, an input/output device, and a central processing unit including a group of general registers and a program status word store, there are provided an instruction word system including a universal instruction word system, and a sequence instruction system containing a portion of the universal word system which control the content of a program status word, and selecting means responsive to an instruction word or an internal processing sequence at the time of interruption for selecting one or the other of the instruction word systems in accordance with data contained at a portion of the bits of the program status words indicates selection of either the universal status word system or the sequence instruction word system.

3 Claims, 8 Drawing Figures

FIG. 4
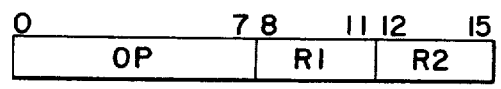
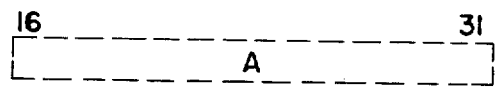
FIG. 5
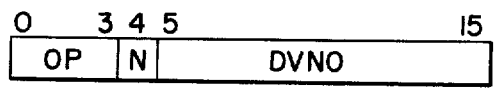
FIG. 6a
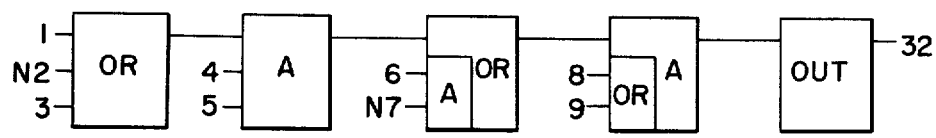
FIG. 6b
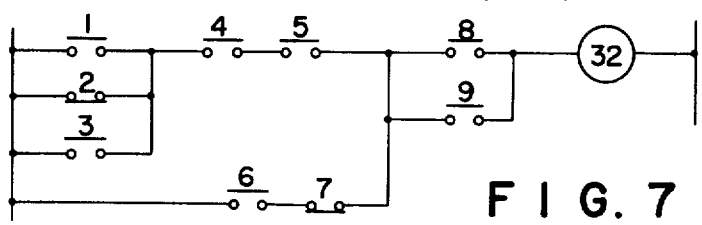
FIG. 7
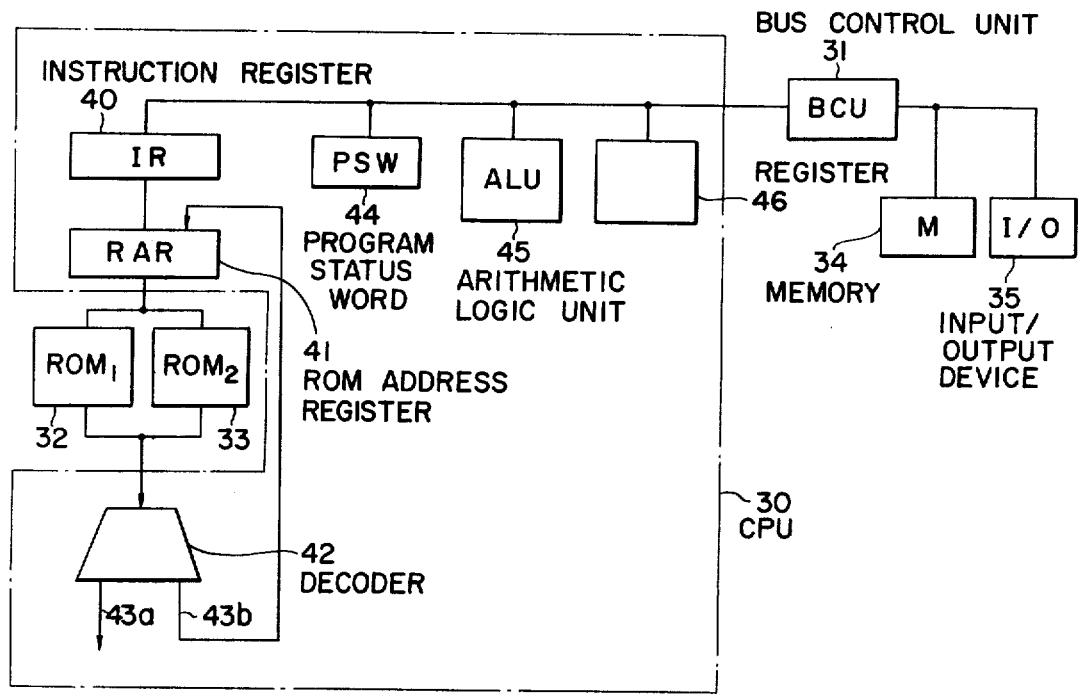

STORED PROGRAM CONTROL SYSTEM WITH SWITCHING BETWEEN INSTRUCTION WORD SYSTEMS

BACKGROUND OF THE INVENTION

This invention relates to a stored program type control system utilizing a micro-processor.

A prior art control system of the type referred to above has been fabricated with integrated circuits such as a TTL (transistor-transistor logic) and considered as a mini-computer which is used exclusively to act as a sequence controller for efficiently executing a sequence. As a result of recent advances in semiconductor techniques, however, a microprocessor fabricated using LSI techniques was developed which is extremely advantageous from the standpoint of cost and reliability. In a sequence controller, it is necessary to use universal instruction words which are utilized in a micro-processor in view of the requirements for improving the data transmission function and self-detection of faults.

For this reason, it has been the practice to use both universal instruction words and sequence instruction words making it desirable (1) to use a program written with universal instruction words, without any modification, and (2) to execute an interruption processing program with either the universal instruction words or the sequence instruction words and to return to the original instruction words when the execution of the interruption processing program is completed.

SUMMARY OF THE INVENTION

It is an object of this invention to provide an improved stored program type control system capable of efficiently processing an interruption without modifying a program.

According to this invention there is provided a stored program type control system comprising a main memory device for storing data and an instruction word, an input/output device for exchanging data with an external apparatus, and a central processing unit including a group of general registers and means storing a program status word and controlling the main memory device and the input/output device, characterized by comprising an instruction word system including a universal instruction word system, and a sequence instruction word system containing a portion of the universal instruction word system which affect the content of a program status word, a portion of the bits of the program status word indicating selection of either the universal instruction word system or the sequence instruction word system, and means responsive to an instruction word or an internal processing operation performed at the time of an interruption condition for selecting one of the instruction word systems depending on the contents of the bit portion of the program status word.

BRIEF DESCRIPTION OF THE DRAWINGS

In the accompanying drawings:

FIG. 4 shows the construction of a universal instruction word utilized in a conventional electronic computer;

FIG. 5 shows the construction of a bit processing instruction utilized in this invention;

FIG. 6a shows a logic program;

FIG. 6b shows a ladder program; and

FIG. 7 shows the detail of the central processing unit shown in FIG. 1.

DESCRIPTION OF THE PREFERRED EMBODIMENT

Figure 1:
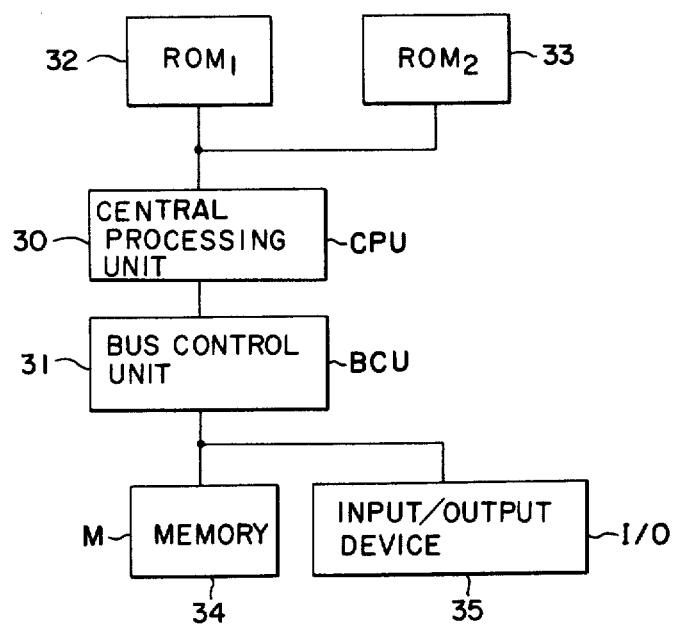
FIG. 1 is a block diagram showing a stored program type control system of this invention having two instruction systems.

A sequence controller shown in FIG. 1 and provided with two instruction systems comprises a central processing unit (CPU) 30 which may be a micro-processor constructed as a LSI circuit, a first read only memory device $ROM_1$ 32 utilized to store a micro-program constructed by universal instruction words, and a second read only memory device $ROM_2$ 33 utilized to store a micro-program constructed by sequence instruction words. These read only memory devices are not used simultaneously and each memory device contains a program for switching to the other, and the central processing unit CPU is controlled by the micro-programs of the read only memory devices.

The control system further comprises a bus control unit BCU which controls the transfer of data between the central processing unit (CPU) 30 and a memory device (M) 34 and an input/output device (I/O) 35 which generally represents a process input/output device for the control device for transmitting and receiving data, etc. The memory device 34 herein used functions to store a program written with universal instruction words, a program written with sequence instruction words and data. The memory device M and the input/output device I/O are connected to the bus control unit BCU via a common or separate bus lines. The detail of the central processing unit will be described later with reference to FIG. 7.

Figure 2:
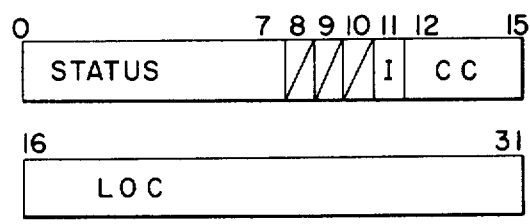
FIG. 2 is a diagram showing the construction of a program status word utilized in this invention.

A central processing unit CPU of any type utilizes program status words PSW comprising an address LOC containing a program to be executed next, a condition code CC for storing the result of processing, and status parts showing interruption OK/not OK, etc. In response to a sequence instruction, the result of execution thereof is stored in the condition code CC. As shown in FIG. 2, according to this invention the 11th bit of the program status word PSW is used as a bit I which represents an instruction word and this bit is used to switch to one of the instruction word systems.

The difference between a universal instruction word and a sequence instruction word is as follows. The universal instruction word is a machine word generally used in a computer and FIG. 4 of the accompanying drawing shows the construction of a mechanic word utilized in TOSBAC-4OL type computer manufactured by the assignee of the present application. Thus, a word has 16 or 32 bits, for example, of which 8 bits comprise an operation code (OP), each 4 following bits comprises a register designation code ($R_1$, $R_2$) and 16 bits comprise imitation data or an address code (A) for transferring data between registers or between registers and addresses or performing computation of the data. Among universal instructions are included a LOAD instruction, a STORE instruction, an ADD instruction, a MULTIPLY instruction, and a LOAD PSW (program status word) instruction. Thus, by using combinations of these instructions, the computer executes its own programs.

On the other hand, the sequence instruction word mainly designates an instruction for processing bits necessary for a sequence controller and contains a portion of the universal instruction.

For example, bit processing instructions include AND, OR, AND/OR, OR/AND, AND/OR*, OR/AND* and OUT instructions. Although not described herein the bit processing instructions also includes a TIMER instruction, a SINGLE SHOT instruction, etc., necessary for a sequence controller.

Principal instructions have the contents as follows:

| AND | $(BR_1) \wedge (DV) \rightarrow (BR_1)$ | (except at the beginning of the sequence) |
|---|---|---|
| | $(DV) \rightarrow (BR_1)$ | (only at the beginning of the sequence) |
| OR | $(BR_1) \vee (DV) \rightarrow (BR_1)$ | (except at the beginning of the sequence) |
| | $(DV) \rightarrow (BR_1)$ | (only at the beginning of the sequence) |
| AND/OR | $(BR_2) \vee (BR_1) \wedge (DV) \rightarrow (BR_1)$ | |
| AND/OR* | $(BR_1) \rightarrow (BR_2)$ | |
| | $(DV) \rightarrow (BR_1)$ | |
| OR/AND | $(BR_2) \wedge [(BR_1) \vee (DV)] \rightarrow (BR_1)$ | |
| OR/AND* | $(BR_1) \rightarrow (BR_2)$ | |
| | $(DV) \rightarrow (BR_1)$ | |
| OUT | $(BR_1) \rightarrow (DV)$ | | where parentheses ( ) show contents of registers or memory devices, AND, OR, etc., represent operation codes and $BR_1$ and $BR_2$ represent bit registers showing the results of the logical operations.

As shown in FIG. 5, a bit processing instruction comprises 16 bits including an operation code (OP), a device number (DVNO) designating an operand which executes a bit computation, and a negation (N) showing that whether an operand is to be logically negated or not. DV described above takes a value that negates the bit state represented by DVNO when N holds whereas a value that does not negate the bit state when N does not hold. In other words, when a bit state is applied, the following equation holds:

$$(DV) = [\overline{N} \wedge (DVNO)] \vee [N \wedge (\overline{DVNO})]$$

To produce the content of $BR_1$, (N) is not used so that $$(DVNO) = (DV).$$

The operations of the principal instructions described above are logical operations utilizing combinations of $BR_1$, $BR_2$ and DV.

If desired, the bit processing instruction may be used as a portion of the universal instruction word without using the operation code of the universal instruction word. However, as the operation code is long (8 bits), if the word is constructed with 16 bits, the number of the devices that can be designated decreases. Accordingly, when one instruction word is constructed with 32 bits, not only the memory space but also the execution time become inefficient. For this reason, it is necessary to provide a instruction system that can be exclusively used to process bits.

FIG. 6a shows a logic diagram or a so-called contactless diagram showing one example utilizing a sequence instruction of this invention, and FIG. 6b shows a ladder diagram corresponding to FIG. 6a. When the logic diagram shown in FIG. 6a is programmed the following results are obtained.

| OR | 1 |
|---|---|
| OR | N, 2 |
| OR | 3 |
| A | 4 |
| A | 5 |
| A/OR* | 6 |
| A/OR | N, 7 |
| OR/A* | 8 |
| OR/A | 9 |
| OUT | 32 |

In this manner respective instructions are stored in a memory device and executed as above described. In FIG. 6a, an AND gate circuit is abbreviated as A. The symbol * applied to AND/OR and OR/AND means the beginning portions of the instructions AND/OR and OR/AND and as above described the processings of the beginning portions and remaining portions are different. Accordingly, there is provided a flip-flop circuit that represents the beginning portion of the sequence and the flip-flop circuit is set at the end of the processing of an OUT instruction that represents the end of a sequence and reset at the end of the processing of another instruction to represent again the beginning portion of the sequence.

In this embodiment, $BR_1$, $BR_2$, and the FLIP-FLOP that represents the start of a sequence are stored as a portion of a condition code of the PSW, so that the controller can resume the original state regardless of an instant at which an interruption is made.

Instead of storing these parameters as a portion of the condition code they may be stored in a general register, and may be saved to a memory device when an interruption is made.

Although a substantial portion of a sequence instruction word comprises a bit processing instruction, it also includes such portions of a universal instruction word as a LOAD instruction, a PSW instruction and an EXCHANGE PSW instruction. The construction of such instruction word is the same as above described and determined such that the operation code would not overlap a bit processing instruction.

Figure 3:
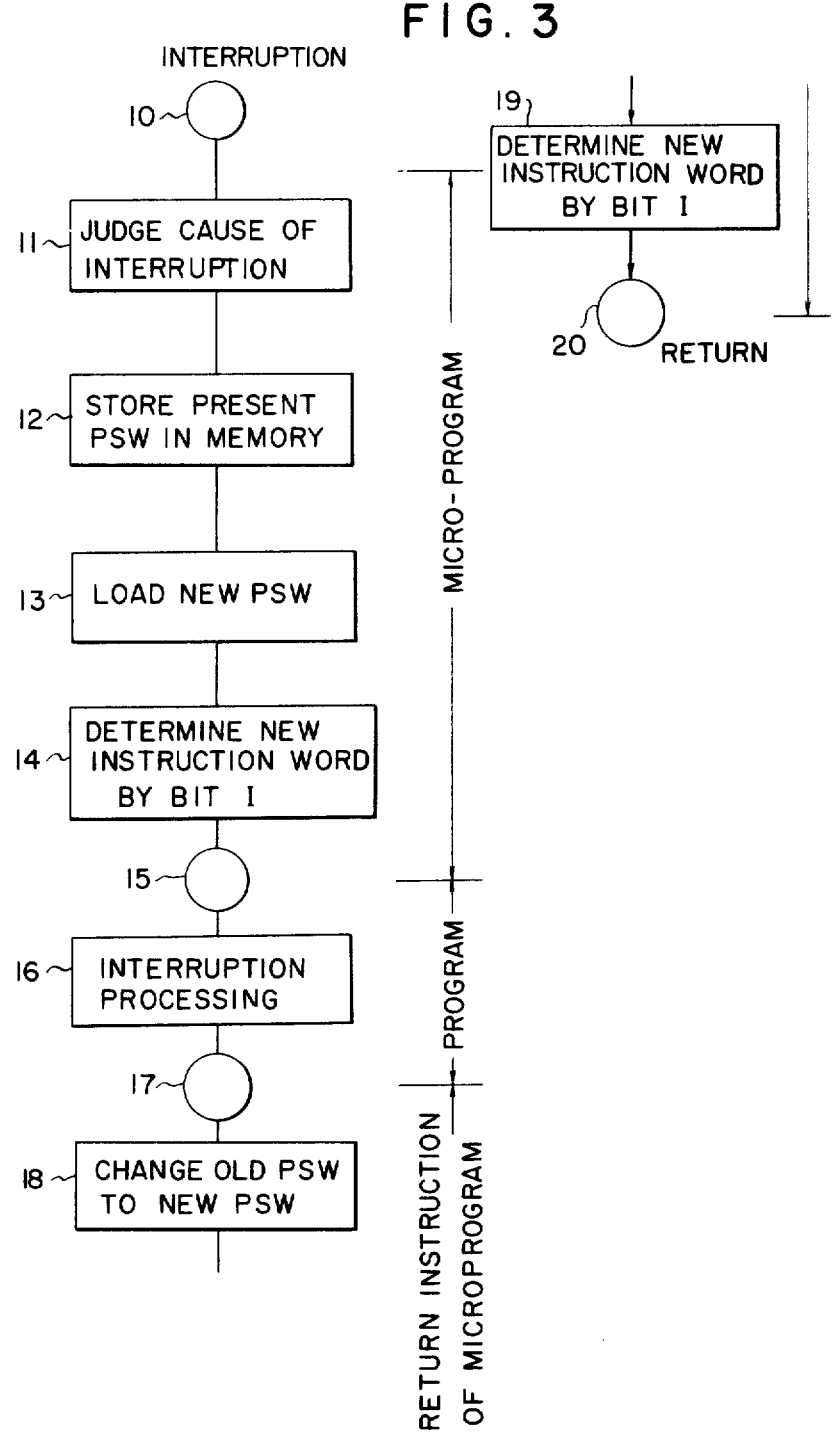
FIG. 3 is a flow chart showing the operation of this invention.

FIG. 3 is a flow chart showing one example of a typical operation performed at the time of interruption. According to the prior art method since steps 14 and 19 are not provided, they will not be described in the first explanation of the illustrated processing. When an interruption signal is received at step 10, the central processing unit CPU judges the cause of the interruption at step 11 for determining where the present PSW is to be stored or saved and from which address the new PSW should be loaded. At step 12, the present PSW is stored as an old PSW in a memory device while in step 13 a new PSW is loaded, for executing the interruption processing program at steps 15 and 16 by a program from an address expressed by the LOC of the PSW. Steps up to step 13 are executed by the micro-program contained in the central processing unit.

At step 16, the interruption processing is performed and then a return instruction is executed to resume the status before interruption.

Steps 17 through 20 correspond to the return instruction of the micro-program. At step 18, a PSW stored at step 12 is loaded as a new PSW and a location counter (LOC), not shown, and other condition codes are returned to their original locations at the time of the interruption at step 20.

According to this invention, at the time of interruption, the next control is determined and the PSW is changed. Accordingly, subsequent to steps 13 and 18, steps 14 and 19 are respectively added for determining a new instruction word by bit I of the PSW.

FIG. 7 shows the detail of the central processing unit CPU shown in FIG. 1. The flow chart shown in FIG. 3 will be described in terms of hardware shown in FIG. 7. The CPU 30 shown in FIG. 7 comprises an instruction register (IR) 40, a ROM address register (RAR) 41, $ROM_1$ 32, $ROM_2$ 33, a decoder 42, a program status word (PSW) store 44, an arithmetic logic unit (ALU) 45 and register 46.

The content of an address represented by a location counter LOC, not shown, of the PSW in store 44 is read out from memory device 34 through bus control unit (BCU) 31 and then stored in the instruction register (IR) 40. The ROM address register (RAR) 41 is operated in accordance with the instruction word stored in the instruction register 40 and PSW to designate a specific address of either one of $ROM_1$ 32 and $ROM_2$ 33. The content read out from either one of the ROMs is decoded by decoder 42 to produce control signals 43a and 43b to control various circuits in the CPU 30, and the bus control unit (BCU) 31 and to determine the address of ROMs. Depending upon the content of the instruction word, a next word is read out, and another address of the memory device and input/output device 35 are accessed. The arithmetic logic unit (ALU) 45 executes an arithmetic and logic operations designated by an instruction. Thus, both word and bit are operated and the result is stored in PSW 44, registers 46, memory device 34 and input/output device 35. Registers 46 may comprise common general registers or working registers.

Execution of an instruction word is performed by a group of data read out from either one of the ROMs. The data content of a ROM corresponds to the program of the content of the memory device 34 and is called a microprogram.

The circuit shown in FIG. 7 operates as follows. When an interruption is made while a program of an instruction system is being executed the microprogram judges whether the interruption is made at the beginning of the instruction or not. Thus, the instruction is applied to the registers 46 via BCU 31 to check the instruction. The interruptions may be classified into an external interruption and an internal interruption and where the interruption should be processed by programs as desired (for example, an immediate interruption or an illegal instruction interruption) other than those which can be processed at a microprogram level (for example, a channel I/O processing), the addresses which store old and new PSW are determined by the device number of the input/output device 35. Accordingly, if necessary, after judging the type of the interruption the I/O device number is acknowledged by the microprogram and a current PSW which has been stored in PSW store 44 is saved to a specific address of the memory device 34 via BCU 31 to read out a new PSW from the specific address of the memory device and store it in PSW 44. Then by the I bit of the PSW, the type of instruction word to be executed next is determined so as to select either one of $ROM_1$ or $ROM_2$. The description described above concerns steps 11, 12, 13 and 14 shown in FIG. 3 and these steps are executed at a microprogram level, whereas at step 16 the instruction is executed at an ordinary program level.

Steps 18 and 19 constitutes a return instruction in which the address of an old PSW previously stored is designated and read out from the memory device 34 and then stored in PSW store 44 via BCU 31 as a current PSW. Now the I bit of PSW determines the type of the instruction word to be executed next thus resuming the status before interruption. Symbols 15 and 17 merely represents NODES.

Thus, according to this invention, at the initial stage of the interruption processing it is not necessary to determine an instruction word by the program. Also it is not necessary to determine an instruction word to which the program is to be returned at the time of returning. Even at the time of an instruction which requests loading of a new PSW instead of an instruction (for example, a LOAD PSW instruction), a new instruction word is always determined by bit I of the PSW. Furthermore, it is possible to use a program written with conventional universal instruction words for the interruption processing without any modification. Finally, it is possible to execute an interruption processing program written with universal instruction words while a sequence instruction is being executed, because an address location counter to be executed next time, and a condition code CC representing the result of execution of the sequence are stored in the PSW. A reverse operation is also possible.

While in the foregoing description, a sequence controller was described as an example, it will be clear that the invention is also applicable to a controller utilizing a larger number of instruction word systems in which case the number of bits I of the PSW is increased and to a controller utilizing other micro-processors, for example a universal controller which utilizes a higher class instruction word system, for example BASIC or FORTRAN instead of universal instruction words.

As above described, the invention provides an efficient sequence controller utilizing sequence instruction words as the universal instruction words and can be executed by a micro-processor or a universal controller utilizing a single or a plurality of instruction words in addition to universal instruction words which are selectively used and the informations thereof are contained in the program status words.

What is claimed is:

1. A stored program control system comprising:
   an input/output device for exchanging data with an external apparatus,
   a main memory device for storing data and instruction words including a set of universal instruction words and a set of sequence instruction words, said set of sequence instruction words containing a portion of said set of universal instruction words and,
   a central processing unit including a plurality of general registers and means storing a program status word, said central processing unit controlling said input/output device and said main memory device, a portion of the bits of said program status word having a status representing selection of either said set of universal instruction words or said set of sequence instruction words, said central processing unit further including means responsive to a processed instruction word or to an internal processing sequence executed at the time of receipt of an interruption message for determining the status of said portion of bits and for selectively executing said set of universal instruction words or said set of sequence instruction words in accordance with the status of said bit portions of said program status word.

2. A control system according to claim 1, further comprising:
- a first ROM containing microprograms used for controlling a central processing unit when a universal instruction is executed,
- a second ROM containing microprograms used for controlling said central processing unit when a sequence instruction is executed, and
- a bus control unit for connecting said central processing unit to said input/output device and said main memory device, said central processing unit further comprising:
- an arithmetic logic unit connected to said bus control unit for executing an arithmetic operation designated by an instruction,
- said program status word store being connected to said bus control unit to store the result of the arithmetic operation executed by said arithmetic logic unit,
- said general registers being connected to said bus control unit to store the result of said arithmetic operation,
- an instruction register connected to said bus control unit to store an instruction word,
- said means for selectively executing selecting said first ROM or said second ROM depending on which of a universal instruction or a sequence instruction is to be executed and including a ROM address register connected between said instruction register and said first and second ROMs and operated by said instruction word stored in said instruction register to designate an address of said first and second ROMs, and
- a decoder connected to said first and second ROMs for decoding information read out from either one of said first and second ROMs to produce control signals which control operation of said central processing unit.

3. A control system according to claim 2, wherein said program status word comprises a plurality of bits which constitute an address containing a program to be executed next, a condition code for storing the result of an arithmetic operation executed by said arithmetic logic unit, and a register designation code, one of said bits of said program status word representing an instruction word indicating which of said set of universal instruction words or said sequence instruction words is to be executed.

* * * * *